March 14, 1944. W. S. LOEB 2,343,915
PISTON RING
Filed April 23, 1942 3 Sheets-Sheet 1
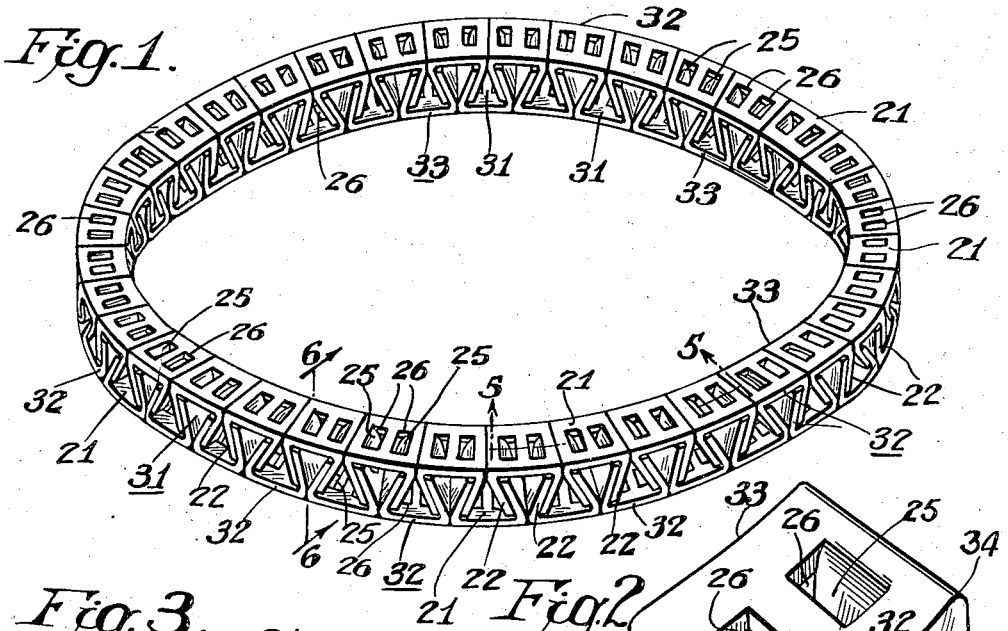
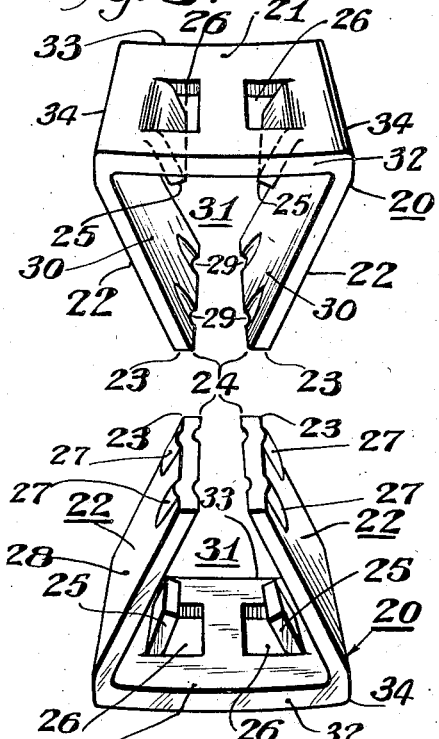
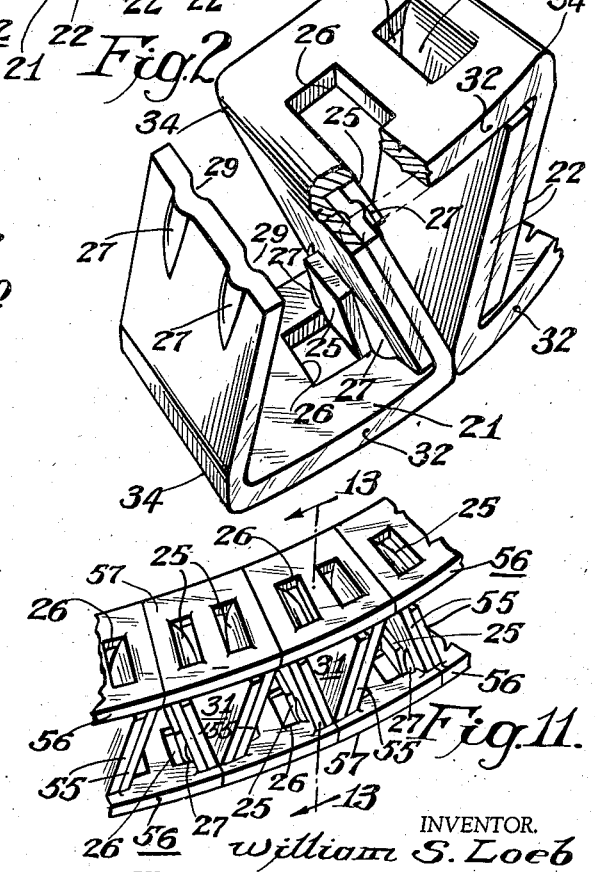
INVENTOR.
William S. Loeb
BY Leonard L. Kalish
Attorney March 14, 1944.   W. S. LOEB   2,343,915
PISTON RING
Filed April 23, 1942   3 Sheets-Sheet 2
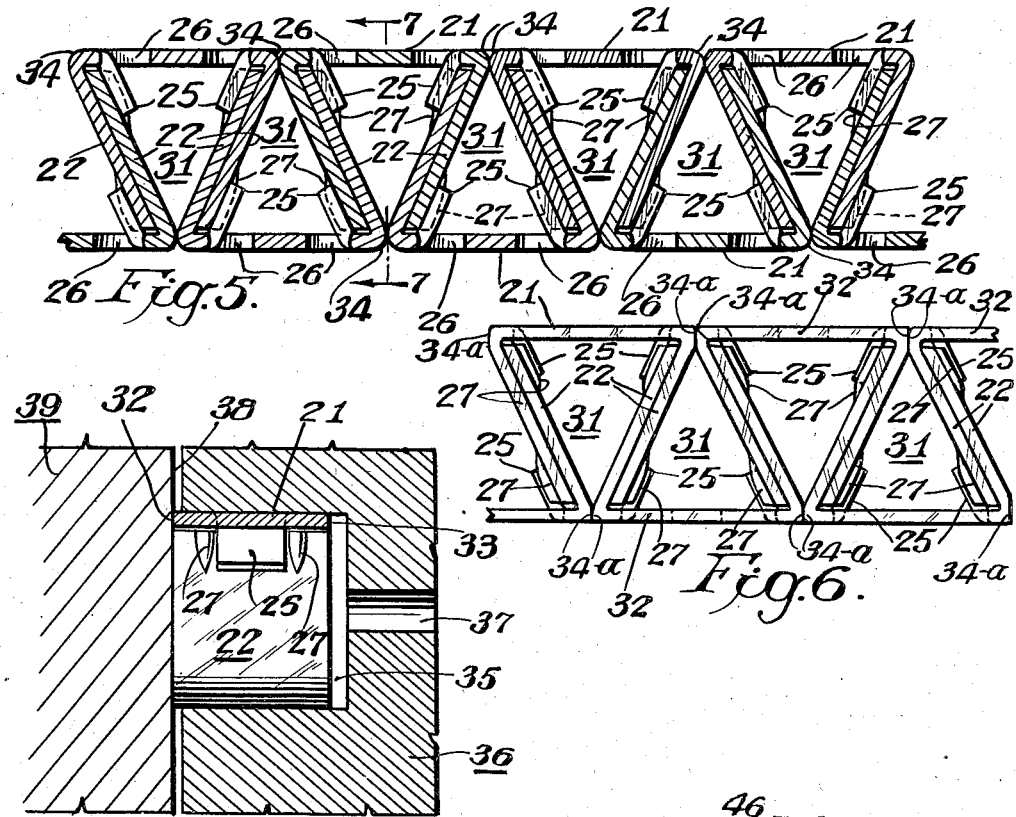
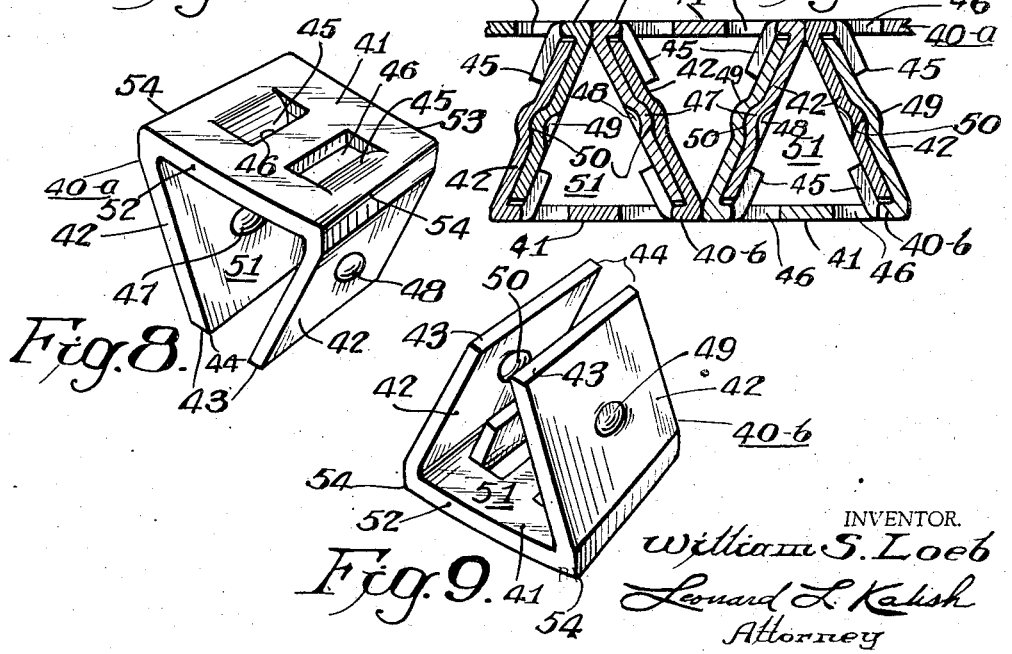
INVENTOR.
William S. Loeb
Leonard L. Kalish
Attorney

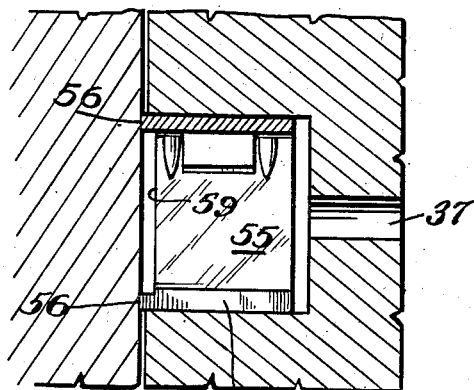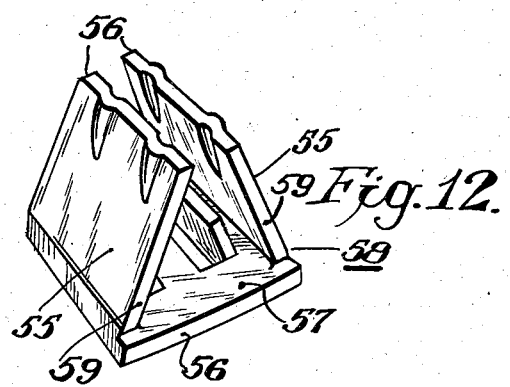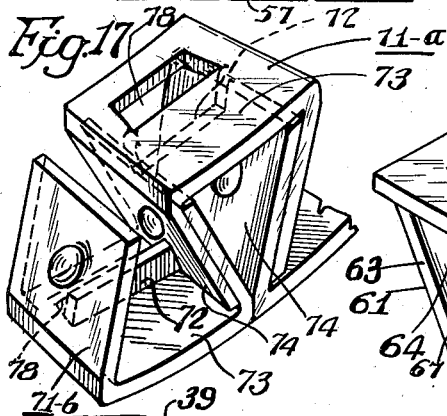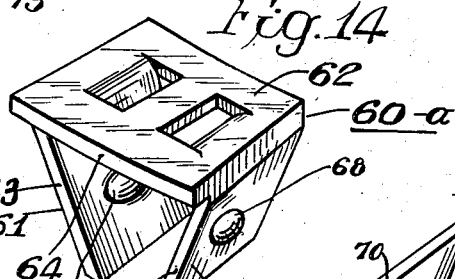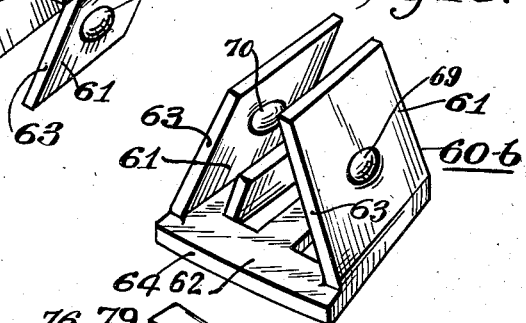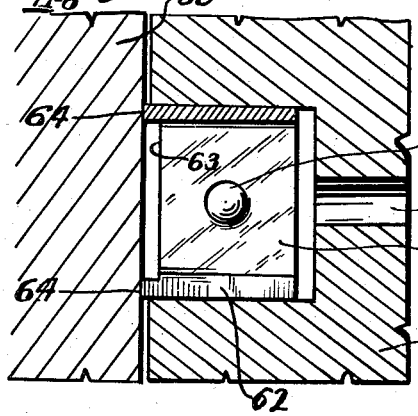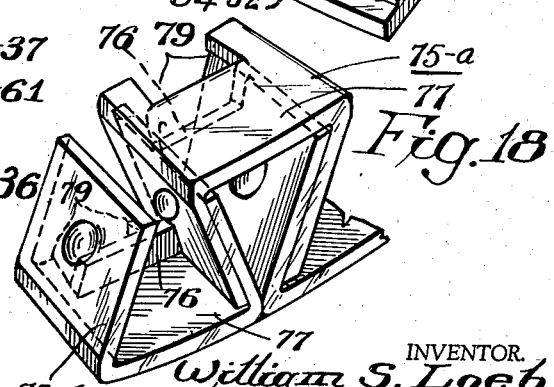

Patented Mar. 14, 1944

2,343,915

UNITED STATES PATENT OFFICE 2,343,915

PISTON RING

William S. Loeb, Philadelphia, Pa., assignor to Wilkening Manufacturing Company, Philadelphia, Pa., a corporation of Delaware Application April 23, 1942, Serial No. 440,184

20 Claims. (Cl. 309—44)

The present invention relates to certain new and useful improvements in piston rings and it relates more particularly to a novel construction for piston rings adapted for use in internal combustion engines.

An object of the present invention is to provide a simple, inexpensive and efficient piston ring for internal combustion engines.

Another object of the present invention is to provide a composite oil-control piston ring made up of a plurality of interchangeable circumferentially-disposed and interlocked segments, disposed in self-interlocking and form-retaining relationship.

With the above and other objects and purposes in view as will be apparent in the following specification, appended claims and accompanying drawings, the present invention comprises a novel self-expanding oil-control piston ring composed of a plurality of interchangeable segments formed of sheet metal or the like, suitably bent and folded to provide oil-passageways therethrough, said segments being removably interlocked with one another and being adapted to be disposed within the groove of a piston with the oil-passageways extending radially of said piston.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a perspective view of one embodiment of the present invention, shown in compressed installed position.

Figure 2 represents a fragmentary perspective view, on a greatly enlarged scale, of the embodiment shown in Figure 1; parts being broken away better to reveal the construction thereof.

Figure 3 represents a perspective view, on an enlarged scale, of one of the segments making up the embodiment illustrated in Figure 1.

Figure 4 represents a perspective view similar to Figure 3 but showing one of the segments as it appears when rotated vertically through 180°.

Figure 5 represents a vertical cross-sectional view, on an enlarged scale, generally along the line 5—5 of Figure 1.

Figure 6 represents an end view, on an enlarged scale, generally in the direction of the arrows 6—6 in Figure 1.

Figure 7 represents a vertical cross-sectional view generally along the line 7—7 of Figure 5.

Figure 8 represents a perspective view, on an enlarged scale, of a modified form of segment as used in another embodiment of the present invention.

Figure 9 represents a perspective view, on an enlarged scale, of the complementary segment for use with the segment shown in Figure 8.

Figure 10 represents a vertical cross-sectional view similar to Figure 5 but showing the modification composed of the segments illustrated in Figures 8 and 9.

Figure 11 represents a fragmentary perspective view, on an enlarged scale, of still another embodiment of the present invention.

Figure 12 represents a perspective view, on an enlarged scale, of one of the segments making up the embodiment shown in Figure 11.

Figure 13 represents a vertical cross-sectional view generally along the line 13—13 of Figure 11.

Figure 14 represents a perspective view, on an enlarged scale, of a segment forming part of another embodiment of the present invention.

Figure 15 represents a perspective view, on an enlarged scale, of the complementary segment employed with the segment shown in Figure 14.

Figure 16 represents a vertical cross-sectional view of the embodiment constructed with the segments shown in Figures 14 and 15.

Figure 17 represents a fragmentary perspective view of another embodiment of the present invention generally similar to the embodiment shown in Figures 8, 9 and 10 but having the elongated ears extending generally circumferentially instead of radially.

Figure 18 represents a view similar to that of Figure 17 but showing a further modification in which the circumferentially extending elongated ears are struck from the radially inner edge of the segments.

In one embodiment of the present invention, shown generally in Figures 1 to 7 inclusive, I may provide a plurality of interchangeable segments indicated generally by the numeral 20. The segments 20 are constructed of sheet metal or the like suitably formed, bent and folded.

Each segment 20 includes a base 21 and a pair of converging sides 22 formed integrally with said base 21 and providing a gap 24 between the free ends 23 of said sides 22. Thus, a channel or passageway 31 of generally triangular cross-section is formed within the segment 20.

As shown particularly in the isometric perspective views of Figures 3 and 4, the segments are given a transverse or radial taper; the fold lines 34 forming the junctures of the sides 22 with the base 21 being formed generally along lines of radius of the cylinder in which the ring is adapted to be used. Thus, the outer or cylinder-contacting edge 32 has a greater circumferential dimension than the inner edge 33 as shown in Figures 1, 3 and 4.

The free ends 23 of the sides 22 also converge radially and extend generally parallel to the adjacent fold-lines 34 forming the junctures of the sides 22 with the base 21.

A pair of ears 25 are struck out of the base 21 and extend generally axially inward therefrom; the ears being generally parallel to the adjacent sides 22 and being separated therefrom by a distance corresponding to the thickness of said sides 22. Openings 26 are formed in the base 21 corresponding to the ears 25.

A pair of ridges 27 are formed on the outer surface 28 of each side 22 and extends generally axially along said side 22 from the free end 23 thereof. Corresponding grooves 29 are formed on the inner surface 30 of the sides 22. The ridges 27 and grooves 29 are generally axially tapered, being widest and deepest at the free end 23 and becoming narrower and shallower as the ridges and grooves extend along the side 22.

Thus, as shown in Figure 7, the clearance between the pair of ridges 27 is smallest at the free end 23.

The outer cylinder-contacting edge 32 of the segment 20 is given a convex curvature corresponding to the curvature of the wall of the cylinder in which the piston ring is to be used. Thus the outer cylinder-contacting edge 32 of each segment 20 is adapted to make snug contact with the cylinder wall continuously along the three-sided edge. The inner edge 33 of the segments 20 may be given a concave curvature or may be left as plane edges.

As shown in Figure 5, the fold-lines 34 are generally rounded interiorly of the segment 20. The radially outermost edges 34—a of the fold-lines 34 are formed as square shoulders by coining or other similar operation during the bending of the segments 20 so that adjacent portions 34—a abut each other for an appreciable axial distance as shown in Figure 6. This provides more or less continuous upper and lower cylinder-contacting ribs or wiper edges when the piston ring is assembled on the piston in the cylinder.

The composite piston ring of the present invention is assembled by interlocking the segments 20 as shown generally in Figure 2. That is, the segments are arranged with their free ends 23 pointing alternately up and down. Adjacent sides 22 of the segments 20 are then hooked over one another as shown in Figure 2 so that each side 22 of each segment 20 is enclosed within the adjacent oppositely-extending segments; the ears 25 fitting between the pairs of ridges 27 to hold the interconnected segments against radial movement. The ears 25 are given a loose fit between the ridges 27 so that a small amount of radial movement of the segments is permitted and thus the segments may adjust themselves to irregularities in the cylinder wall such as may be caused by wear. When the segments 20 are fully assembled, a generally continuous ring is formed. That is, there is no "free end" or "gap" as is the case with conventional piston rings which are formed of one-piece annuli. The fully-assembled piston ring is so dimensioned as to be compressed slightly when assembled on a piston within a cylinder. Due to the resilience of the sheet metal segments 20, the assembled piston ring has an inherent resilient tension which tends to expand it radially and circumferentially. In this way, there is no need for a separate expander spring as is usually required with conventional oil-control piston rings. The piston ring may be assembled in the groove 35 of a piston 36 of conventional construction having oil-drain passageways 37 extending radially from the groove 35 to the inside of the piston 36. The outer cylinder-contacting edge 32 of each of the segments 20 fits snugly against the wall 38 of the cylinder 39.

During axial movement of the piston 36 within the cylinder 39, oil is wiped from the wall 38 of the cylinder 39 by the cylinder-contacting edges 32 and is sent through the passageways 31 of the segments 20, the groove 35, and the oil-drain passageways 37 and is returned to the crank-case thus permitting lubrication of the cylinder wall.

The segments 20 are composed of sheet metal or other suitable material and are formed by suitable stamping, punching, bending, coining, grinding and/or other manufacturing steps in any desired sequence.

Another embodiment of the present invention is shown in Figures 8, 9 and 10. In this embodiment, segments 40—a and 40—b are employed which are generally the same as the segments 20 shown in Figures 1 to 7 inclusive. Each of the segments 40—a and 40—b is composed of a base 41, converging sides 42 having free ends 43 having a gap 44 therebetween. Ears 45 are struck from the base 41 leaving openings 46 therein similar to the corresponding parts of the segments 20. However, the segments 40—a and 40—b do not have ridges and grooves formed therein but, instead, an inwardly-extending button 47, and corresponding depression 48, are formed on each of the sides 42 of the segment 40—a while an outwardly-extending button 49, and corresponding depression 50, are formed on each of the sides 42 of the segment 40—b.

When the segments 40—a and 40—b are assembled, as shown in Figure 10, the inwardly-extending button 47 of the segment 40—a fits within the depression 50 of the segment 40—b. The depression 50 is made somewhat larger than the button 47 so that a slight radial movement of the respective segments is permitted and thus the segments may conform to any irregularities in the cylinder wall, such as may be caused by wear.

The segments 40—a and 40—b again define generally triangular passageways 51 similar to the passageways 31 of the embodiment shown in Figures 1 to 7. The radially outer cylinder-contacting edges 52 of the segments 40—a and 40—b are convexly rounded to conform to the wall of the cylinder. The radially inner edges 53 may be concavely rounded or may be left plane.

The fold lines 54 forming the juncture of the sides 42 and the base 41 are again tapered radially inwardly, being formed along lines of radius corresponding to the size of cylinder in which the piston ring is to be used. The free ends 43 of the sides 42 are correspondingly radially tapered and extend generally parallel to the adjacent fold-lines 54.

In the drawings, the fold-lines 54 are shown as being coined into generally flat shoulders throughout their entire radial dimension. It would be possible to form the fold-lines 54 with only the outermost edges coined and with the remaining portions thereof generally rounded corresponding to the embodiment shown in Figures 5 and 6. Similarly it would be possible to construct the embodiment of Figures 1 to 7 with fully-coined fold-lines as shown in Figures 8, 9 and 10.

The method of assembly of the embodiment shown in Figure 10 is generally the same as that described hereinabove in connection with the embodiment of Figures 1 to 7. However, since segments 40—a and 40—b are not identical, they cannot be interchanged and must be assembled in their proper position with the free ends 43 of the sides 42 thereof extending respectively downward and upward. The segments 40—a and 40—b again may be constructed by suitable forming steps in any desired sequence.

The operation of the embodiment shown in Figures 8, 9 and 10 is generally the same as that described hereinabove in connection with the embodiment of Figures 1 to 7.

Still another embodiment of the present invention is shown in Figures 11, 12 and 13. This embodiment corresponds generally to the embodiment of Figures 1 to 7 except that the converging sides 55 of the segments 58 terminate short of the radially outermost edge 66 of the base 57. That is, the radially outermost edges 59 of the sides 55 terminate short of the outer edge 56 of the base 57. Thus, as shown in Figure 13, the outer edges 59 of the sides 55 are recessed from the cylinder wall when the piston ring is assembled; the only contact between the piston ring and the cylinder wall being along the generally continuous axially-separated ribs formed by adjacent edges 56 of the bases 57. The edges 56 are suitably convexly rounded to conform to the cylinder wall, while it is no longer necessary to round the outer edges 59 of the sides 55.

The embodiment shown in Figures 11, 12 and 13 may, in some respects, be preferred since the reduction in contact-area between the piston ring and the cylinder wall reduces friction and wear and increases the unit pressure of the piston ring against the cylinder wall. In this grooved embodiment, the problem of grinding the outer cylinder-contacting edge to conform to the cylinder wall is also simplified since merely a single straight edge need be ground upon each segment.

In Figures 14, 15 and 16, there is shown another embodiment of the present invention in which segments 60—a and 60—b corresponding generally to the segments 40—a and 40—b, as shown in Figures 8, 9 and 10, are modified so that the sides 61 thereof terminate short of the base 62. That is, the radially outer edges 63 of the sides 61 terminate short of the convexly rounded radially outer cylinder-contacting edge 64 of the base 62. Thus, the only contact between the piston ring and the cylinder wall is along the generally continuous axially-separated annular ribs formed by adjacent edges 64 of adjoining bases 62. Each of the segments 60—a has an inwardly-extending button 67 and corresponding depression 68 (similar to the button 47 and depression 48 of the embodiment shown in Figures 8, 9 and 10) while each of the segments 60—b has an outwardly-extending button 69 and corresponding depression 70 (similar to the button 49 and depression 50 of the embodiment shown in Figures 8, 9 and 10). When the embodiment is assembled, the buttons 67 of the segments 60 fit within the matching (and slightly oversized) depressions 70 of the segments 60—b.

In Figure 17 there is shown another embodiment of the present invention, in which segments 71—a and 71—b corresponding generally to the segments 40—a and 40—b, as shown in Figures 8, 9 and 10, are modified in the formation of the ears. That is, instead of having a pair of ears struck out and folded along generally radial lines as shown in the embodiment of Figures 8, 9 and 10, each of the segments 71—a and 71—b is provided with a single elongated trapezoidal ear 72 which is struck out from the base 73 and is folded axially inward along a fold-line which extends generally circumferentially of the piston ring, or, more accurately, chord-wise of said piston ring; a corresponding opening 78 being formed in said base 73.

When the segments 71—a and 71—b are assembled, the slanted ends of the axially inwardly extending trapezoidal ears 72 serve as an abutment for the converging sides 74 of the adjacent dovetailed interlocked segments.

In Figure 18 there is shown another embodiment of the present invention which is identical with the embodiment of Figure 17 in all respects except that the elongated trapezoidal circumferentially extending ears 76 of the segments 75—a and 75—b are struck from the radially inner edge of the bases 77 so that, instead of having an opening in the base, the embodiment of Figure 18 has a trapezoidal indentation 79 formed at the radially inner edge thereof.

Formation of the ear along the radially inner edge of the base instead of at an intermediate point thereon has the advantage of requiring a simpler forming operation.

It is, of course, obvious that the ear formation shown in Figures 17 and 18 could be employed equally well with the embodiments shown in Figures 2, 11 and 14 without departing from the spirit of the present invention.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed to be new and desired to be secured by Letters Patent is:

1. An oil-control piston-ring comprising a plurality of individual circumferentially-disposed segments of sheet metal or the like bent and folded generally axially to provide radially-extending oil-passageways therethrough, each of said segments being separably engaged in circumferentially-fixed relationship with its adjoining segments to provide a generally continuous annulus.

2. An oil-control piston-ring comprising a plurality of individual circumferentially-disposed segments of sheet metal or the like, each of said segments having a base and having a pair of converging free sides and being open at the radial edges thereof thereby to provide a cross-sectionally-triangular radially-extending oil-passageway therethrough, each of said segments being separably engaged with its adjoining segments to provide a generally continuous annulus.

3. An oil-control piston-ring comprising a plurality of individual circumferentially-disposed segments of sheet metal or the like, each of said segments having a base and having a pair of converging free sides and being open at the radial edges thereof thereby to provide a cross-sectionally-triangular radially-extending oil-passageway therethrough, successive segments being disposed with the free ends of their sides extending in alternately opposite axial directions, the free sides of each segment overlapping the sides of adjacent segments thereby to interlock said segments and to provide a generally continuous annulus.

4. An oil-control piston-ring comprising a plurality of individual circumferentially-disposed segments of sheet metal or the like suitably bent and folded to provide radially-extending oil-passageways therethrough, each of said segments having a pair of generally axially-extending free sides, the free sides of each of said segments overlapping the sides of adjacent segments thereby to provide a more or less continuous ring.

5. An oil-control piston-ring comprising a plurality of individual circumferentially-disposed segments formed of sheet metal or the like, each of said segments having a base disposed in a generally radial plane and having a pair of free sides formed integrally with said base and extending generally axially therefrom, said base and said free sides enclosing a generally radially-extending oil-passageway, successive segments being disposed with their free sides extending in opposite axial directions, the free sides of successive segments being interlocked to provide a generally continuous annulus.

6. An oil-control piston-ring comprising a plurality of individual circumferentially-disposed segments formed of sheet metal or the like, each of said segments having a base disposed in a generally radial plane and having a pair of converging sides formed integrally with said base and extending generally axially therefrom, said base and said converging sides enclosing a cross-sectionally-triangular generally radially-extending oil-passageway, successive segments being disposed with their free sides extending in opposite axial directions, the free sides of successive segments being interlocked to provide a generally continuous annulus.

7. An oil-control piston-ring comprising a plurality of individual circumferentially-disposed segments formed of sheet metal or the like, each of said segments having a base disposed in a generally radial plane and having a pair of free sides formed integrally with said base and extending generally axially therefrom, said base and said free sides enclosing a generally radially-extending oil-passageway, successive segments being disposed with their free sides extending in opposite axial directions, the free sides of successive segments being interlocked to provide a generally continuous annulus, and means provided upon said free sides for limiting the relative radial movement of said individual segments.

8. An oil-control piston-ring comprising a plurality of individual circumferentially-disposed segments formed of sheet metal or the like, each of said segments having a base disposed in a generally radial plane and having a pair of converging sides formed integrally with said base and extending generally axially therefrom, said base and said converging sides enclosing a cross-sectionally-triangular generally radially-extending oil-passageway, successive segments being disposed with their free sides extending in opposite axial directions, the free sides of successive segments being interlocked to provide a generally continuous annulus, and interengaging means carried by successive segments for limiting the relative radial movement of individual segments.

9. An oil-control piston-ring comprising a plurality of individual circumferentially-disposed segments formed of sheet metal or the like, each of said segments having a base disposed in a generally radial plane and having a pair of converging sides formed integrally with said base and extending generally axially therefrom, said base and said converging sides enclosing a cross-sectionally-triangular generally radially-extending oil-passageway, successive segments being disposed with their free sides extending in opposite axial directions, the free sides of successive segments being interlocked to provide a generally continuous annulus, and complementary protuberances and depressions formed on the interlocked free sides of successive segments for limiting the relative radial movement thereof.

10. An oil-control piston-ring comprising a plurality of individual circumferentially-disposed segments formed of sheet metal or the like, each of said segments having a base disposed in a generally radial plane and having a pair of converging sides formed integrally with said base and extending generally axially therefrom, said base and said converging sides enclosing a cross-sectionally-triangular generally radially-extending oil-passageway, successive segments being disposed with their free sides extending in opposite axial directions, the free sides of successive segments being interlocked to provide a generally continuous annulus, and a pair of ears struck inwardly from the base of each segment, said ears extending generally parallel to the adjacent free sides and spaced therefrom thereby partially to enclose the free ends of the interlocked sides of adjacent segments.

11. An oil-control piston-ring comprising a plurality of individual circumferentially-disposed segments formed of sheet metal or the like, each of said segments having a base disposed in a generally radial plane and having a pair of converging sides formed integrally with said base and extending generally axially therefrom, said base and said converging sides enclosing a cross-sectionally-triangular generally radially-extending oil-passageway, successive segments being disposed with their free sides extending in opposite axial directions, the free sides of successive segments being interlocked to provide a generally continuous annulus, a pair of ears struck inwardly from the base of each segment, said ears extending generally parallel to the adjacent free sides and spaced therefrom thereby partially to enclose the free ends of the interlocked sides of adjacent segments, and a pair of spaced axially-extending outwardly-pressed ridges formed at the free end of each of said sides, said pair of ridges and said ears cooperating to limit relative radial movement of individual segments.

12. An oil-control piston-ring comprising a plurality of individual circumferentially-disposed segments formed of sheet metal or the like, each having a base lying in a generally radial plane and a pair of converging free sides formed integrally with said base and extending generally axially therefrom, said base being radially tapered, successive segments being disposed with their free ends extending in alternate opposite axial directions, the free sides of adjacent sections being interlocked to provide a generally continuous annulus.

13. A self-expanding oil-control piston-ring for use on a piston within a cylinder of an internal combustion engine, comprising a plurality of individual circumferentially-disposed segments formed of sheet metal or the like having open radially inner and radially outer edges thereby to provide a radially-extending oil-passageway therethrough, each of said segments being separably engaged with its adjoining segments in circumferentially-fixed relationship to provide a generally continuous annulus, the outer radial edges of said segments being convexly curved to conform to the wall of the cylinder.

14. An oil-control piston-ring comprising a plurality of individual circumferentially-disposed segments formed of sheet metal or the like, each having a base lying in a generally radial plane and having a pair of free sides formed integrally with said base and extending generally axially therefrom, said segments being open at the radial edges thereof to provide oil-passageways therethrough, the free sides of adjacent segments being interlocked to provide a generally continuous annulus, the outer radial edges of the free sides being recessed from the outer radial edges of said base.

15. A self-expanding oil-control piston-ring for use on a piston within a cylinder of an internal combustion engine comprising a plurality of individual circumferentially-disposed segments, each having a base lying in a generally radial plane and having a pair of converging free sides formed integrally with said base and extending generally axially therefrom, said segments being open at their radially outer edges and radially inner edges thereby to provide oil-passageways therethrough, successive segments being disposed with their free sides extending in alternately opposite axial directions, the free sides of adjacent segments being interlocked to provide a generally continuous annulus, the outer radial edges of the free sides of each segment being recessed from the outer radial edge of the base thereof, the outer radial edges of the bases of alternate segments forming a pair of generally continuous axially-spaced cylinder-contacting ribs.

16. An oil-control piston-ring comprising a plurality of individual circumferentially-disposed segments, each having an oil-passageway extending generally radially therethrough, each of said segments being separably engaged with its adjoining segments in circumferentially-fixed relationship to provide a generally continuous annulus.

17. A self-expanding oil-control piston-ring comprising a plurality of circumferentially-disposed segments of sheet metal or the like interlocked in circumferentially-fixed relationship to form a generally continuous annulus having oil-passageways extending generally radially therethrough.

18. An oil-control piston-ring comprising a plurality of individual circumferentially-disposed segments formed of sheet metal or the like, each of said segments having a base disposed in a generally radial plane and having a pair of converging free sides formed integrally with said base and extending generally axially therefrom, said base and said converging sides forming a cross-sectionally-triangular generally radially-extending oil-passageway, each of said segments having an ear struck inwardly from said base and extending generally axially therefrom, said ear being spaced apart from said converging sides; successive segments being disposed with their free sides extending in opposite axial directions, the free sides of successive segments being interlocked to provide a generally continuous annulus, the free ends of the interlocked sides being enclosed and supported by the inturned ears.

19. An oil-control piston-ring comprising a plurality of individual circumferentially-disposed segments formed of sheet metal or the like, each of said segments having a base disposed in a generally radial plane and having a pair of converging free sides formed integrally with said base and extending generally axially therefrom, said base and said converging sides forming a cross-sectionally-triangular generally radially-extending oil-passageway, each of said segments having a generally trapezoidal ear struck inwardly from said base and extending generally axially therefrom with the slanted ends of said ear extending generally parallel to the adjacent free sides and spaced apart therefrom; successive segments being disposed with their free sides extending in opposite axial directions, the free sides of successive segments being interlocked to provide a generally continuous annulus, the free ends of the interlocked sides being enclosed and supported by the slanted sides of the ears.

20. An oil-control piston-ring comprising a plurality of individual circumferentially-disposed segments formed of sheet metal or the like; each of said segments having a base disposed in a generally radial plane and having a pair of converging free sides formed integrally with said base and extending generally axially therefrom, said base and said converging sides forming a cross-sectionally-triangular generally radially-extending oil-passageway, each of said segments having a plurality of ears struck inwardly from said base and extending generally axially therefrom, said ears being spaced apart from said converging sides; successive segments being disposed with their free sides extending in opposite axial directions, the free sides of successive segments being interlocked to provide a generally continuous annulus, the free ends of the interlocked sides being enclosed and supported by the inturned ears.

WILLIAM S. LOEB.